(12) United States Patent
Zhang et al.

(10) Patent No.: US 11,620,983 B2
(45) Date of Patent: Apr. 4, 2023

(54) SPEECH RECOGNITION METHOD, DEVICE, AND COMPUTER-READABLE STORAGE MEDIUM

(71) Applicant: BAIDU ONLINE NETWORK TECHNOLOGY (BEIJING) CO., LTD, Beijing (CN)

(72) Inventors: Ce Zhang, Beijing (CN); Bin Huang, Beijing (CN); Xin Li, Beijing (CN); Jinfeng Bai, Beijing (CN); Xu Chen, Beijing (CN); Lei Jia, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 163 days.

(21) Appl. No.: 16/988,913

(22) Filed: Aug. 10, 2020

(65) Prior Publication Data

US 2021/0158799 A1 May 27, 2021

(30) Foreign Application Priority Data

Nov. 25, 2019 (CN) .......................... 201911164974.2

(51) Int. Cl.
*G10L 15/06* (2013.01)
*G10L 15/02* (2006.01)

(52) U.S. Cl.
CPC ............ *G10L 15/063* (2013.01); *G10L 15/02* (2013.01)

(58) Field of Classification Search
CPC .............................. G10L 15/063; G10L 15/02
See application file for complete search history.

(56) References Cited

U.S. PATENT DOCUMENTS 9,886,949 B2 2/2018 Li et al.
11,062,725 B2 * 7/2021 Variani ................ G10L 19/008
2019/0237065 A1 * 8/2019 Xue ........................ G10L 15/20
(Continued)

FOREIGN PATENT DOCUMENTS

CN 106782585 A 5/2017
CN 108463848 A 8/2018
(Continued)

OTHER PUBLICATIONS

Ko et al., "A study on data augmentation of reverberant speech for robust speech recognition," 2017 IEEE International Conference on Acoustics, Speech and Signal Processing (ICASSP), 2017, pp. 5220-5224, doi: 10.1109/ICASSP.2017.7953152. (Year: 2017).*

(Continued)

*Primary Examiner* — Michelle M Koeth
(74) *Attorney, Agent, or Firm* — Frost Brown Todd LLP

(57) ABSTRACT

The disclosure provides a speech recognition method, a device and a computer-readable storage medium. The method includes obtaining a first voice signal collected from a first microphone in a microphone array and a second voice signal collected from a second microphone in the microphone array, the microphone array including at least two microphones, such as two, three or six microphones. The method further includes extracting enhanced features associated with the first voice signal and the second voice signal through a neural network, and obtaining a speech recognition result based on the enhanced features extracted.

16 Claims, 6 Drawing Sheets

(56) References Cited

U.S. PATENT DOCUMENTS

| | | | |
|---|---|---|---|
| 2019/0355375 A1 | | 11/2019 | Lichun et al. |
| 2021/0020175 A1* | | 1/2021 | Shao .................. G10L 15/32 |
| 2021/0372595 A1* | | 12/2021 | Jung .................. H04R 1/02 |
| 2021/0383795 A1* | | 12/2021 | Li .................. G10L 15/08 |

FOREIGN PATENT DOCUMENTS

| | | |
|---|---|---|
| CN | 108877823 A | 11/2018 |
| CN | 109389990 A | 2/2019 |
| CN | 109767769 A | 5/2019 |
| CN | 109935226 A | 6/2019 |
| EP | 3381033 A1 | 10/2018 |
| JP | H11-69494 A | 3/1999 |
| JP | 2017-520803 | 7/2017 |
| JP | 2019-020598 A | 2/2019 |
| JP | 2019-508730 A | 3/2019 |
| KR | 10-2018-0095886 A | 8/2018 |
| WO | WO 2018-037643 | 3/2018 |
| WO | WO 2019/139660 A1 | 7/2019 |

OTHER PUBLICATIONS

Allen et al., "Image method for efficiently simulating small-room acoustics," The Journal of the Acoustical Society of America 65, 943 (1979). (Year: 1979).*

Sivasankaran et al., "Keyword-based speaker localization: Localizing a target speaker in a multi-speaker environment," Interspeech 2018—19th Annual Conference of the International Speech Communication Association, Sep. 2018, Hyderabad, India, hal-01817519 (Year: 2018).*

Choi et al., "Phase-aware Speech Enhancement With Deep Complex U-Net," Mar. 7, 2019, arXiv:1903.03107v1 [cs.SD], (Year: 2019).*

Ouyang et al., "A Fully Convolutional Neural Network for Complex Spectrogram Processing in Speech Enhancement," ICASSP 2019—2019 IEEE International Conference on Acoustics, Speech and Signal Processing (ICASSP), 2019, pp. 5756-5760, doi: 10.1109/ICASSP.2019.8683423. (Year: 2019).*

Wang et al., "Stream Attention-based Multi-array End-to-end Speech Recognition," ICASSP 2019—2019 IEEE International Conference on Acoustics, Speech and Signal Processing (ICASSP), 2019, pp. 7105-7109, doi: 10.1109/ICASSP.2019.8682650 (Year: 2019).*

E. Dong, Y. Lu and S. Du, "An Improved SSD Algorithm and Its Mobile Terminal Implementation," 2019 IEEE International Conference on Mechatronics and Automation (ICMA), Tianjin, China, Aug. 2019, pp. 2319-2324, doi: 10.1109/ICMA.2019.8816601. (Year: 2019).*

Chinese Office Action dated Feb. 5, 2021 for Application No. 201911164974.2, 9 pages.

Japanese Office Action dated Apr. 11, 2022 for Application No. 2020-187686, 10 pages.

Baidu Research Group, "A Breakthrough in Speech Technology: Baidu Launched SMLTA, the First Streaming Multi-layer Truncated Attention Model for Large-scale Online Speech Recognition." Internet, Jan. 21, 2019; URL: http://research.baid.com/Blog/index~view?id=109; accessed on Apr. 8, 2022, 3 pages.

Japanese Office Action dated Aug. 2, 2022 for Application No. 2020-187686, 10 pages.

* cited by examiner

SPEECH RECOGNITION METHOD, DEVICE, AND COMPUTER-READABLE STORAGE MEDIUM

CROSS-REFERENCE TO RELATED APPLICATION

This application claims priority to Chinese Patent Application No. 201911164974.2, filed on Nov. 25, 2019, the entire contents of which are incorporated herein by reference.

FIELD

Embodiments of the disclosure generally relate to the field of computer technologies, and more particularly, to the field of speech technologies.

BACKGROUND

Speech recognition refers to the process of converting voice signals into corresponding texts or characters through a computer, which is one of the main ways for realizing human-machine interaction. In recent years, with the widespread use of deep learning technologies in the field of speech recognition, the accuracy of speech recognition has been greatly improved. In addition, scenes requiring speech recognition have become very rich due to the continuous popularity of smart devices. For example, speech recognition technologies have been widely used in industries and scenes such as smart home, vehicle-mounted voice, and smart office. Speech recognition technologies combined with technologies such as natural language processing and speech synthesis may produce more complex applications, such as a smart speaker, conference simultaneous interpretation, and a smart customer service assistant.

According to a distance between a sound source and a pickup, speech recognition may include near-field speech recognition and far-field speech recognition. The near-field speech recognition refers to that a computer may recognize speech at close-distance conditions, for example, during the use of speech input. The far-field speech recognition refers to that the computer may recognize speech under long-distance conditions, for example, during the process of using a smart speaker or a vehicle-mounted navigation device. In scenes of far-field speech recognition, due to a large amount of environmental noise and reverberation in the real-world environment, the quality of signals picked up decreases, so the accuracy of far-field speech recognition is lower than that of near-field speech recognition. In a far-field environment, since a target sound source is far away from the pickup, target signals may be attenuated greatly. In addition, due to a noisy environment and a great number of interference signals, the signal-to-noise ratio is low and the performance of speech recognition is poor. Generally speaking, a user interacting with a smart speaker a few meters away from the smart speaker is a typical scene of far-field speech recognition.

SUMMARY

In a first aspect of the disclosure, a speech recognition method is provided. The method includes: obtaining a first voice signal collected from a first microphone in a microphone array and a second voice signal collected from a second microphone in the microphone array, in which the second microphone is different from the first microphone; extracting enhanced features associated with the first voice signal and the second voice signal through a neural network; and obtaining a speech recognition result based on the enhanced features.

In a second aspect of the disclosure, an electronic device is provided. The electronic device includes one or more processors and a storage device configured to store one or more programs. When the one or more programs are executed by the one or more processors, the electronic device is caused to implement various methods and/or processes according to embodiments of the disclosure.

In a third aspect of the disclosure, a computer-readable storage medium having a computer program stored thereon is provided. When the program is executed by a processor, various methods and/or processes according to embodiments of the disclosure are implemented.

It should be understood that the Summary of the disclosure is not intended to limit key or important features of embodiments of the disclosure, nor is it intended to limit the scope of the disclosure. Other features of the disclosure will become easier to be understood through the following description.

BRIEF DESCRIPTION OF THE DRAWINGS

The above and other features, advantages, and aspects of embodiments of the disclosure will become more apparent in combination with the accompanying drawings and with reference to the following detailed description. In the accompanying drawings, the same or similar reference numerals indicate the same or similar elements.

DETAILED DESCRIPTION

Embodiments of the disclosure will be described in more detail below with reference to the accompanying drawings. While certain embodiments of the disclosure have been illustrated in the accompanying drawings, it is to be understood that the disclosure may be embodied in various forms and should not be construed as being limited to the embodiments set forth herein. Instead, these embodiments are provided for a thorough and complete understanding of the disclosure. It should be understood that the drawings and embodiments of the disclosure are for illustrative purposes only and are not intended to limit the scope of the disclosure.

In the description of the embodiments of the disclosure, the term "includes" and its equivalents should be construed as open-ended inclusions, i.e., "includes, but is not limited to". The term "according to" should be understood as "at least partially according to". The term "an embodiment" or "the embodiment" should be understood as "at least one embodiment". The term "some embodiments" should be understood as "at least some embodiments". Other explicit and implicit definitions may also be included below.

A typical speech recognition scene includes a target sound source, a non-target sound source (such as a noise source), a pickup (such as a microphone or a microphone array), and a speech recognition software system. For example, for a smart speaker in a home scene, the target sound source is a user who makes sound toward the smart speaker; the non-target sound source is sound interference from the surrounding environment, such as noises from a household appliance; and the pickup and speech recognition software system are hardware and software of the smart speaker. Among the signals picked up by the pickup, a signal from the target sound source is called a target signal, and a signal from the non-target sound source is called an interference signal. The ratio of a strength of the target signal to a strength of the interference signal is called a signal-to-noise ratio. Currently, the performance of speech recognition is well in scenes of a high signal-to-noise ratio (such as near-field speech recognition scenes), and unstable in scenes of a low signal-to-noise ratio (far-field speech recognition scenes).

Figure 1:
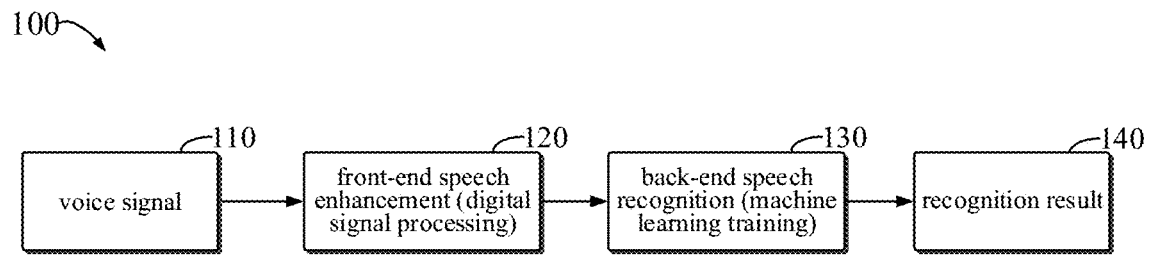
FIG. 1 is a schematic diagram of a conventional speech recognition process.

In order to improve the accuracy of far-field speech recognition, a microphone array is usually used as a pickup to improve the quality of speech collection. The multi-channel voice signal processing technology is used to enhance the target signal and to improve the accuracy of speech recognition. FIG. 1 is a schematic diagram of a conventional speech recognition process. For a voice signal 110 obtained, the voice signal 110 is enhanced by digital signal processing at block 120. Speech recognition is performed on the enhanced voice signal at block 130, and a recognition result 140 is obtained. During the training process, back-end speech recognition employs enhanced voice signals to train a back-end recognition model.

The purpose of conventional front-end speech enhancement is to enhance the target signal by using digital signal processing technology so as to obtain clearer speech/voice. The front-end speech enhancement usually includes direction of arrival (DOA) and beamforming (BF). The DOA technology is mainly used to estimate the direction of the target sound source, and the BF technology enhances the target signal with position information of the target sound source and suppresses the interference signal. Commonly-used DOA technologies include directional algorithms based on arrival delay and directional algorithms based on spatial spectrum estimation. Commonly-used BF technologies include minimum variance distortionless response beamforming (MVDR BF), linearly constrained minimum variance beamforming (LCMV BF) and generalized sidelobe cancellation beamforming (GSC BF). It may be seen that essentially, the conventional front-end speech enhancement protects signals from the direction of the target sound source (such as speech/voice from a target sector), and suppresses signals from directions of non-target sound sources (such as speech/voice from the outside of the target sector) as much as possible. In addition, some improved methods try to improve the front-end speech enhancement through other technologies. However, these improved methods are still based on the Filter-and-Sum method of signal processing. It is necessary to assume that orientations of the target sound source and the noise source are inconsistent. Features of different directions are extracted from multi-channel speeches/voices through spatial filtering and frequency domain filtering. Consequently, these improved methods are essentially dependent on the conventional digital signal processing technology.

However, conventional speech enhancement methods based on digital signal processing have some defects, resulting in a relatively high error rate of speech recognition. On the one hand, optimization objectives of the front-end speech enhancement and the back-end training are not the same. The optimization process of the front-end speech enhancement process is independent of the back-end speech recognition process. The optimization objective of the front-end speech enhancement process is to retain the target signal and to suppress interference noises from the perspective of signal-to-noise ratio. Such the optimization objective is inconsistent with the final objective (that is, improving the accuracy of speech recognition) of the back-end speech recognition. Due to the inconsistency of the objectives, it is likely that the optimization result of the front-end enhancement is not optimal for the final objective. In other words, conventional speech enhancement algorithms based on digital signal processing cannot be learned and optimized together with a neural network of the back-end speech recognition. In addition, the front-end speech enhancement and the back-end speech recognition lack a unified optimization method, and there is no solution to align optimization objectives of DOA and BF with the objective of speech recognition. On the other hand, in the conventional front-end speech enhancement process, Beamforming strongly depends on the positioned direction and on some priori assumptions. Beamforming based on digital signal processing need to first estimate the direction of the target sound source, and to protect the target sound source while suppressing signals from directions other than this direction. In an actual application scene, once a positioning error occurs, the interference signal may be erroneously enhanced, and the target signal may be suppressed erroneously, thereby affecting subsequent wakeup and recognition performance. In addition, approaching the beam of signal processing through some means will also be limited by drawbacks of the signal processing method, affecting the accuracy of speech recognition.

To this end, embodiments of the disclosure propose an end-to-end model architecture and speech recognition solution for speech enhancement and recognition based on a neural network. Unlike conventional speech enhancement methods based on digital signal processing, embodiments of the disclosure extract the enhanced features of multi-channel voice signals through the neural network, which may solve the problem of inconsistency in optimization objectives of speech enhancement and speech recognition. Consequently, objectives of speech enhancement, speech recognition and the like may be optimized jointly, end-to-end modeling of speech enhancement and speech recognition is realized, and the accuracy of speech recognition is improved.

Therefore, according to embodiments of the disclosure, by employing end-to-end training, sound source positioning and beam generation may be performed simultaneously. Due to the exhaustion of a mass of combined scenes of the target signals and the interference signals during training, when a spot noise source and a beam direction are of the same direction, the performance of the solution according to embodiments of the disclosure will not decrease sharply. In addition, recognition rates in any direction of microphones are basically consistent. At the same time, based on conventional signal processing methods, the first wakeup is a wakeup with a single microphone signal. The wakeup rate is low, and the beam wakeup may only be used when the second wakeup and the first wakeup are in the same direction. For the integrated speech enhancement and recognition model of embodiments of the disclosure, the accuracy of beam wakeup may be achieved for the first wakeup, and high-precision recognition may be performed at all angles after the wakeup, thereby effectively ensuring the accuracy and robustness of a speech recognition system.

In addition, in some embodiments of the disclosure, a complex convolutional neural network (CNN) may be used to directly perform multi-scale and multi-layer information extraction on original multi-channel voice signals to realize front-end beamforming and extraction of enhanced features while preserving phase information, thereby achieving integrated modeling of speech enhancement and recognition. The conventional method usually discards the phase information directly after the Fourier transform. On the contrary, embodiments of the disclosure may learn additional information from the phase of the voice signals to train the neural network model, and to further improve the accuracy of speech recognition.

In addition, in some embodiments of the disclosure, far-field voice signals may be simulated in real time based on near-field voice signals. Unlike conventional manual recording of room impulse responses and offline noise addition, embodiments of the disclosure may use a combination of real-time simulation/online simulation and the noise addition technology, which may randomly simulate massive combinations of room impulse responses, noises and speeches/voices during the training process in real time, such that the diversity of data is greatly enriched, and the model may obtain better generalization performance from richer data. Therefore, embodiments of the disclosure may quickly obtain a large amount of training data of far-field voice signals, thereby improving the accuracy of the speech recognition model through training of machine learning.

Some exemplary implementations of embodiments of the disclosure will be described in detail below with reference to FIGS. 2-8.

Figure 2:
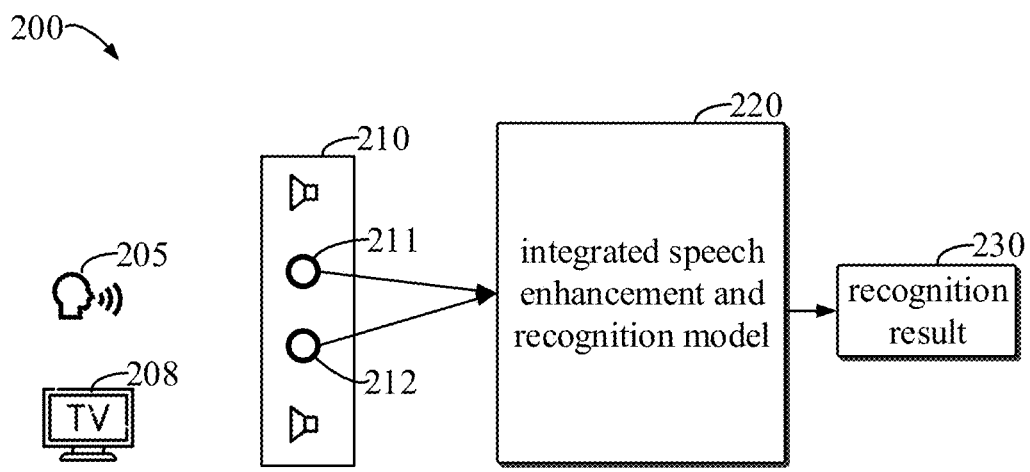
FIG. 2 is a schematic diagram of an exemplary speech recognition scene according to an embodiment of the disclosure.

FIG. 2 is a schematic diagram of an exemplary speech recognition scene 200 according to an embodiment of the disclosure. It should be understood that the exemplary speech recognition scene 200 is only an example scene where the embodiments of the disclosure may be implemented, and is not intended to limit the protection scope of the disclosure.

As illustrated in FIG. 2, in the exemplary speech recognition scene 200, a user 205 is performing voice input on a user device 210. In some embodiments of the disclosure, the user device 210 may be a smart speaker, which may include a plurality of speakers and microphones 211 and 212. The microphones 211 and 212 may form a microphone array to improve the signal collection quality of speech recognition. It should be understood that although the smart speaker is used as an example of the user device in some embodiments of the disclosure, the user device may be any electronic device capable of collecting voice signals. The user device includes, but is not limited to, a smartphone, a tablet, a desktop computer, a notebook computer, a smart wearable device (such as a smart watch, and a pair of smart glasses), a navigation device, a multimedia player device, an educational device, a gaming device, a smart speaker, and so on.

When the user 205 is performing voice input, a television 208 in the scene 200 is also making sound. For the user device 210, the sound from the user 205 is the sound that needs to be recognized, so the user 205 is the target sound source. The sound from the television 208 is noise that does not need to be considered, so the television 208 is the non-target sound source.

Unlike the conventional speech enhancement based on digital signal processing, embodiments of the disclosure may model original voice signals collected by the microphones 211 and 212 to obtain an integrated speech enhancement and recognition model 220. A corresponding recognition result 230 is obtained by the integrated speech enhancement and recognition model 220. The integrated speech enhancement and recognition model 220 may include an enhanced feature extraction module based on a complex CNN and a speech recognition module based on an attention model. The two modules directly model the voice signals from the microphone array, such that on the one hand, there is no need to rely on the digital signal processing technology, and on the other hand, advantages of big data and neural networks may be effectively used. Automatically optimizing network weights in a data-driven manner may achieve a better effect than a fine signal filter designed manually. Therefore, such an end-to-end modeling method solves the problem that optimization objectives of the conventional front-end speech enhancement and back-end speech recognition of signals are not unified. In some embodiments, such an end-to-end modeling method may jointly optimize objectives such as speech enhancement, noise reduction, sound source positioning, wakeup and recognition, thereby reducing the complexity of the entire system, and performing far better than the conventional method of separate modeling and optimization.

In the exemplary speech recognition scene 200 illustrated in FIG. 2, the integrated speech enhancement and recognition model 220 may be entirely deployed locally on the user device, entirely deployed on the server side, or partially deployed locally on the user device and partially deployed on the server side or in the cloud. Embodiments of the disclosure do not limit the deployment mode and position of the integrated speech enhancement and recognition model 220. In a case where the user device and the server cooperatively deploy the integrated speech enhancement and recognition model 220, the user device side may deploy the enhanced feature extraction module based on the complex CNN, and the server side may deploy the speech recognition module based on the attention model. After enhanced features of the voice signals are extracted, the enhanced features may be sent from the user device to the server for the server side to perform speech recognition.

In different scenes, the speech recognition result obtained may be processed in different ways. For example, in a voice input scene, after the speech recognition result is obtained, the recognition result may be displayed on a display of the user device 210 in real time. During streaming speech recognition, the recognition result displayed on the display also changes dynamically, such that the user may know the recognized result in real time and the user experience may be improved. In some embodiments, the user device 210 may not include a display. Instead, the user device 210 may output the recognition result through its audio output device (for example, a speaker). In a scene of the smart speaker, the server may directly perform further actions based on the recognition result. For example, when the speech/voice of the user is playing a song, the server sends an audio file of the song to the user device 210 based on the intention of the user to play the song through the speaker.

Figure 3:
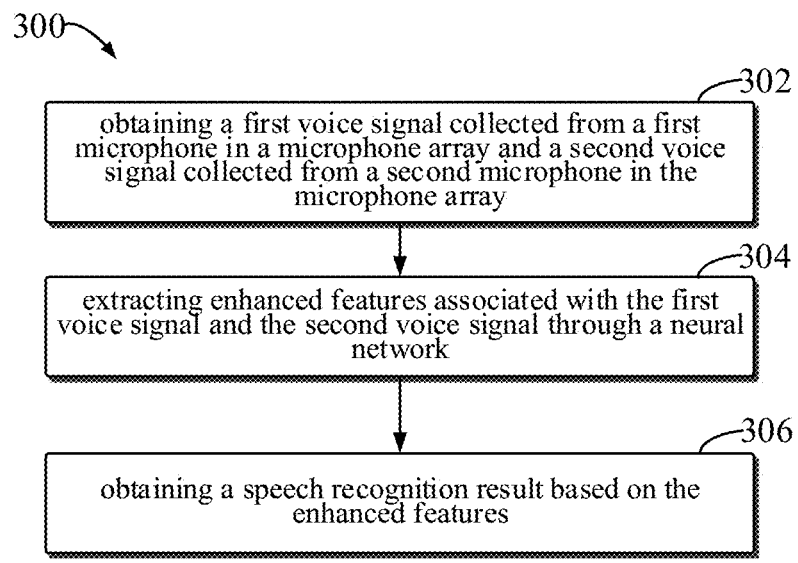
FIG. 3 is a flowchart of a speech recognition method according to an embodiment of the disclosure.

FIG. 3 is a flowchart of a speech recognition method 300 according to an embodiment of the disclosure. It should be understood that the method 300 may be performed by the user device, the server, or a combination thereof.

At block 302, a first voice signal collected from a first microphone in a microphone array and a second voice signal collected from a second microphone in the microphone array are obtained. The second microphone is different from the first microphone. For example, referring to FIG. 2, the integrated speech enhancement and recognition model 220 obtains original voice signals collected from the microphones 211 and 212, respectively. In some embodiments, when the microphone array in the user device 210 includes three microphones, three channels of voice signals may be obtained from the three microphones at the same time. In some embodiments, when the microphone array in the user device 210 includes six microphones, six channels of voice signals may be obtained from the six microphones at the same time.

At block 304, enhanced features, such as multi-dimensional feature vectors, associated with the first voice signal and the second voice signal are extracted through a neural network. For example, the integrated speech enhancement and recognition model 220 directly processes voice signals of respective channels through the neural network without using the conventional digital signal processing technology, and thus a priori assumption in the subject of speech recognition is unnecessary. In this manner, optimization objectives of respective modules in the integrated speech enhancement and recognition model 220 may be unified. Optimization criteria of the respective modules are to improve the accuracy rate of speech recognition or to reduce an error rate of speech recognition. In some embodiments of the disclosure, the neural network may be the complex CNN network, and thus the phase information in the voice signals collected by the microphone array may be taken into consideration, and the operation of feature extraction may be performed in the form of complex numbers.

At block 306, a speech recognition result is obtained based on the enhanced features. For example, the integrated speech enhancement and recognition model 220 uses the neural network model to obtain a corresponding speech recognition result based on the extracted enhanced features. In a case where the microphone array includes more than two microphones, the corresponding recognition result is obtained based on more than two channels of voice signals.

Therefore, unlike conventional speech enhancement methods based on digital signal processing, the method 300 according to the embodiment of the disclosure extracts the enhanced features of multi-channel voice signals through the neural network, which may solve the problem of inconsistency in optimization objectives of speech enhancement and speech recognition. Consequently, objectives of speech enhancement, speech recognition and the like may be optimized jointly, end-to-end modeling of speech enhancement and speech recognition is realized, and the accuracy of speech recognition is improved.

Figure 4:
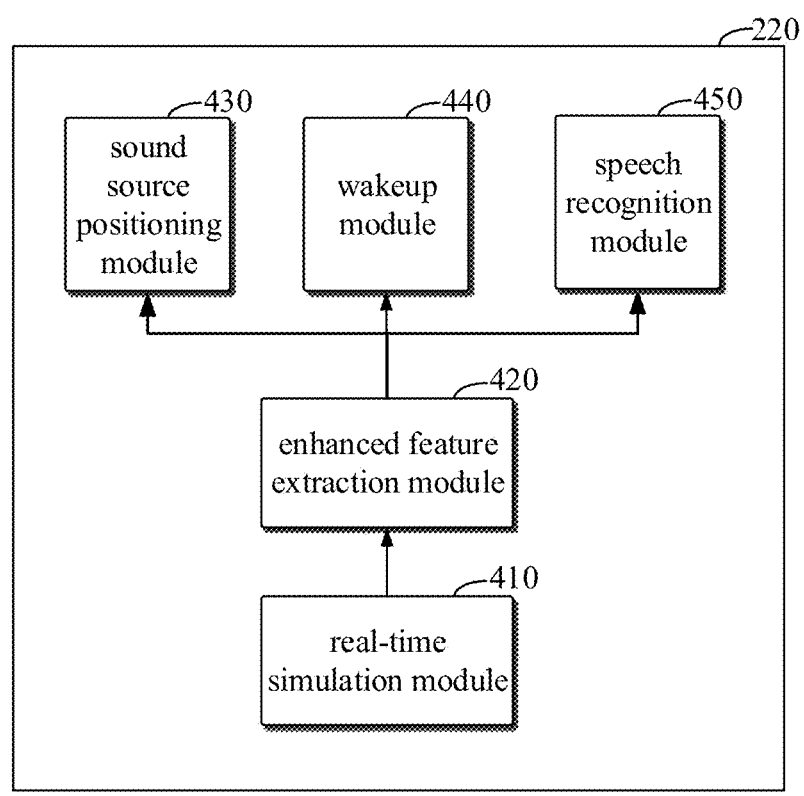
FIG. 4 is a schematic diagram of an architecture of an integrated speech enhancement and recognition model according to an embodiment of the disclosure.

FIG. 4 is a schematic diagram of an architecture of the integrated speech enhancement and recognition model 220 according to an embodiment of the disclosure. As illustrated in FIG. 4, in order to implement speech enhancement and speech recognition, the integrated speech enhancement and recognition model 220 needs to include an enhanced feature extraction module 420 and a speech recognition module 450. Optionally, the integrated speech enhancement and recognition model 220 may also include a real-time simulation module 410 for simulating far-field voice signals online, a sound source positioning module 430 for enhancing the user experience by alerting the user with a reminder light, and a wakeup module 440 for waking up the back-end recognition process. The integrated speech enhancement and recognition model 220 is an end-to-end model. In the training process, the training data is far-field voice signals and characters corresponding to the far-field voice signals. In addition, the embodiment of the disclosure provides a way to simulate far-field voice signals online in real time, so that the training data may be the recorded near-field voice signals and characters corresponding to the recorded near-field voice signals. In the use stage, the integrated speech enhancement and recognition model 220 directly obtains and processes the original voice signals collected by the microphone array, and then outputs the corresponding recognition result.

The real-time simulation module 410 may simulate a near-field voice signal into a far-field voice signal, and add a random interference sound source to the far-field voice signal simulated, thereby generating a large number of far-field voice signals for model training. The following describes an exemplary implementation of simulating near-field voice signals into far-field voice signals in real time with reference to FIG. 6.

In some embodiments, the enhanced feature extraction module 420 may be implemented by the complex CNN. Using the complex CNN for feature enhancement may retain the phase information in the microphone array for the reason that, in a scene of the microphone array, phase information and amplitude of each voice signal are equally important, and the phase information is represented by an imaginary part in the complex number. And then, a modulo operation is performed on the enhanced features output by the complex CNN, and complex-domain features are converted into enhanced features in the real number.

The sound source positioning module 430 may output positioning information of the target sound source, so that the reminder light may be turned on in a direction corresponding to the user to remind the user that the system has sensed a voice signal in a corresponding direction (i.e., the direction of the user), thereby improving the user experience. The wakeup module 440 is configured to perform monitoring in a standby state to determine whether the user is performing voice interaction with the user device. For example, when it is determined that the user speaks predefined words (for example, "Xiaodu, Xiaodu", "Hi, Xiaodu", etc.), the back-end speech recognition process may be woken up without initiating the back-end speech recognition for all voice signals collected as the initiation cost of speech recognition is relatively high. Therefore, with the wakeup determination, the cost of speech recognition may be reduced.

The speech recognition module 450 obtains the speech recognition result based on the enhanced features. In some embodiments, the speech recognition module 450 may be a streaming multi-layer truncated attention (SMLTA) model, which is a streaming speech recognition model based on connectionist temporal classification (CTC) and attention. "Streaming" represents that it is possible to directly perform incremental decoding on short segments of speech/voice (instead of complete sentences) one by one. "Multi-layer" represents stacking a multi-layer attention model. "Truncated" represents dividing the speech/voice into short segments by using information of peaks of the CTC model, and modeling and decoding of the attention model may be developed on these short fragments. SMLTA transforms conventional global attention modeling into local attention modeling, so such this process is also a process that may be realized through streaming. No matter how long a sentence is, streaming decoding and accurate local attention modeling may be achieved through truncation, thereby achieving streaming decoding. The CTC model is an end-to-end model that is configured for speech recognition of large-scale vocabularies. The acoustic model structure combining a deep neural network (DNN)+a hidden Markov model (HMM) is completely replaced by a unified neural network structure, which greatly simplifies the structure and training difficulty of the acoustic model. Consequently, the accuracy of the speech recognition system is improved.

Figure 5:
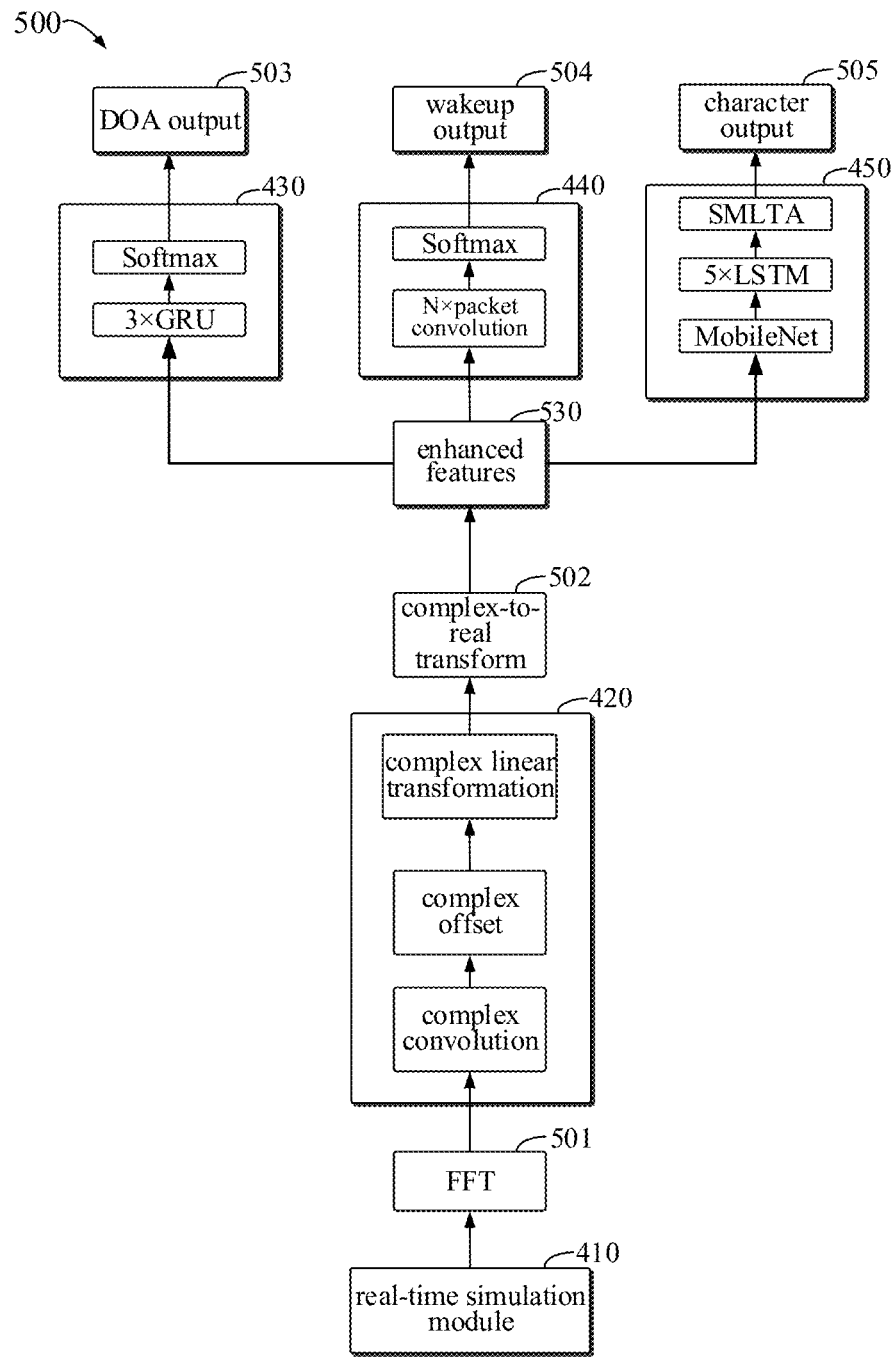
FIG. 5 is a schematic diagram of processing of an integrated speech enhancement and recognition model based on a complex convolutional neural network according to an embodiment of the disclosure

FIG. 5 is a schematic diagram of processing 500 of an integrated speech enhancement and recognition model based on a complex convolutional neural network according to an embodiment of the disclosure, which may be based on the architecture illustrated in FIG. 4.

In some embodiments of the disclosure, during the training stage of the integrated speech enhancement and recognition model 220, the real-time simulation module 410 simulates the far-field voice signals online for subsequent machine learning training. In the use stage of the integrated speech enhancement and recognition model 220, multi-channel original voice signals are directly obtained from the microphone array.

After obtaining the voice signal input, at block 501, a complex fast Fourier transform (FFT) is performed on each channel of voice signals separately to convert a time domain signal into a frequency domain signal. And then, the enhanced feature extraction module 420 uses the complex CNN to perform complex convolution, complex offset and complex linear transformation on each channel of voice signals obtained after the FFT to obtain complex features. Since the complex CNN is configured to directly perform multi-scale and multi-layer information extraction on the original multi-channel voice signals, the front-end beamforming and enhanced feature extraction are realized under the premise of retaining phase information, so that additional information may be learned from the phase information of the voice signals to further improve the accuracy of speech recognition.

Since the speech recognition module 450 generally only supports real number operations, at block 502, modulo is performed on the enhanced features output by the complex CNN to convert complex domain features into enhanced features 530 in the real number. According to the architecture of the embodiment of the disclosure, the extracted enhanced features 530 may be shared by the sound source positioning module 430, the wakeup module 440, and the speech recognition module 450 as input features of these modules.

With continued reference to FIG. 5, the sound source positioning module 430 may include a three-layer gated recurrent unit (GRU), and may generate a DOA output 503, for example, direction information of the target sound source, through a layer of Softmax to further turn on a reminder light of a corresponding direction, thereby improving the user experience. The wakeup module 440 mainly includes a multi-layer (e.g., N-layer) packet convolutional neural network, and may generate a wakeup output 504 through a layer of Softmax. The wakeup output 504 may include a determination of whether the collected voice signal is a wakeup word. If the collected voice signal is the wakeup word, the recognition process at the speech recognition module 450 may be initiated.

The speech recognition module 450 includes a low-frame-rate feature extraction module (for example, a network structure MobileNet designed for mobile terminals), a long short-term memory (LSTM), and the SMLTA model. MobileNet may realize the function of feature compression. The conventional method transmits synthesized voice signals, and the method according to embodiments of the disclosure transmits the enhanced features. Without compression, the enhanced features may occupy more network bandwidth or cause a longer delay. To solve this problem, the embodiment of the disclosure uses MobileNet to compress the enhanced features 530, so that the size of the compressed features is always of a predetermined size. In this manner, for a microphone array including two or three microphones, the size of the enhanced features transmitted is the same as the size of the voice signals transmitted by the conventional method, and thus the delay caused by network transmission is avoided. Therefore, the bandwidth of the enhanced features extracted from multi-channel speeches/voices is equivalent to that of single-channel compressed speech/voice. Compared with the multi-channel speeches/voices, such a method not only saves bandwidth, but also protects user privacy by uploading intermediate features of the neural network.

During training, the integrated speech enhancement and recognition model 220 uses a strategy of simultaneous optimization of a plurality of loss functions to jointly train the network, and different loss functions may adopt different weighting coefficients. In some embodiments, in actual deployment, a strategy of distributed deployment of the end and the cloud may also be adopted, where the end includes functions such as beamforming, enhanced feature extraction, positioning, and wakeup. Since the complex CNN model is small and convolution operators are more versatile, the complex CNN model is suitable for parallel and hardware acceleration, and may complete calculations on the end in real time. The enhanced feature extraction module may include several layers of depthwise separable convolutions, and model parameters of the enhanced feature extraction module are also very small.

It should be understood that the network structure and values illustrated in FIG. 5 may be adjusted according to actual conditions. At the same time, in order to realize online real-time decoding, the above-mentioned GRU, LSTM and other recurrent neural networks may be unidirectional. Therefore, the embodiment of the disclosure uses the complex CNN to model the original signals from the microphone array, enabling joint end-to-end training of positioning, wakeup, and recognition.

In general, in order to achieve end-to-end training, inputs to the neural network need to be original voice signals from the microphone array. However, due to reasons such as user privacy and transmission bandwidth, it is difficult to obtain a large amount of such real data in practice. The conventional training data collection method is usually to record room impulse responses (RIRs) of several rooms in the actual scene. Such a method is inefficient and costly, and it is difficult to traverse all scenes. The impulse responses may simulate responses to speeches/voices in randomly selected configurations.

The propagation of speech/voice in far-field speech/voice scenes is usually related to parameters such as the structure of the microphone array, room size, distance of sound source and pickup, and so on. Changes in these parameters lead to complex scenes of multi-channel far-field data. Training data of multi-channel far-field voice signals is difficult to be collected. Consequently, the embodiment of the disclosure provides an online real-time simulation of far-field voice signals, which may obtain a large amount of training data of the far-field voice signals through random parameter configurations.

Figure 6:
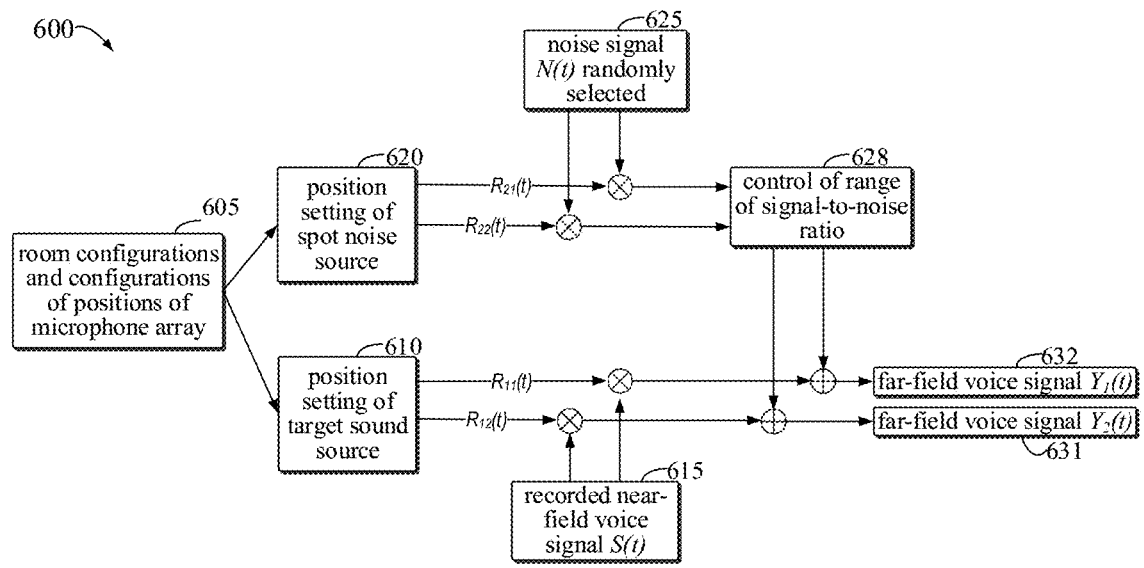
FIG. 6 is a schematic diagram of a process of simulating far-field voice signals in real time according to the disclosure.

FIG. 6 is a schematic diagram of a process 600 of simulating far-field voice signals in real time according to the disclosure, which may be implemented by the real-time simulation module 410 described above. The integrated speech enhancement and recognition model 220 according to embodiments of the disclosure needs to be adaptively trained based on the number of microphones in the microphone array of a target user device or target product. That is to say, when there are two microphones in the target product, two-channel far-field voice signals are used to train the model; when there are three microphones in the target product, three-channel far-field voice signals are used to train the model; and when there are six microphones in the target product, six-channel far-field voice signals are used to train the model. According to the embodiment of the disclosure, multi-channel far-field voice signals are generated in real time based on randomly simulated room impulse responses, noises, and speech during training, thereby making end-to-end training of speech enhancement and recognition based on a large amount of data possible.

FIG. 6 shows multi-channel far-field voice signals $Y_1(t)$ and $Y_2(t)$ simulated in real time by a random noise addition based on a recorded near-field voice signal S(t). First, at block 605, room configurations such as a room size (i.e., length, width, and height) and a wall reflection coefficient are randomly set, and microphones of a specified size are randomly placed in reasonable positions in a room. At block 610, the target sound source is randomly placed at a reasonable position in the room, and at block 620, the spot noise source is randomly placed at another reasonable position in the room. In addition, at block 615, the recorded near-field voice signal S(t) is provided, and at block 625, a noise signal N(t) randomly selected is provided.

According to the room configurations, the positions of the microphones, and the position of the target sound source, impulse responses $R_{11}(t)$ and $R_{12}(t)$ are generated, and according to the room configurations, the positions of the microphones, and the position of the spot noise source, impulse responses $R_{21}(t)$ and $R_{22}(t)$ are generated. The near-field voice signal S(t) and the impulse responses $R_{11}(t)$ and $R_{12}(t)$ are convolved to obtain far-field voice signals, and the randomly selected noise signal N(t) and the impulse responses $R_{21}(t)$ and $R_{22}(t)$ are convolved to obtain far-field noise signals. At block 628, through controlling of the signal-to-noise ratio, the far-field voice signals and the far-field noise signals are superimposed in proportion to obtain two-channel far-field voice signals $Y_1(t)$ and $Y_2(t)$ with noise as illustrated in, for example, 631 and 632. The following shows an example process of calculating the two-channel far-field voice signals $Y_1(t)$ and $Y_2(t)$ by equations (1) and (2), where α represents the signal-to-noise ratio.

$$Y_1(t)=S(t)*R_{11}(t)+\alpha N(t)*R_{21}(t) \quad (1)$$

$$Y_2(t)=S(t)*R_{12}(t)+\alpha N(t)*R_{22}(t) \quad (2)$$

Therefore, the embodiment of the disclosure uses online real-time simulation and noise addition technology, which may randomly simulate a large amount of combinations of room impact responses, noises, and voices in real time during the training process, greatly enriching the diversity of data, and making the model to obtain better generalization performance from the enriched data.

Figure 7:
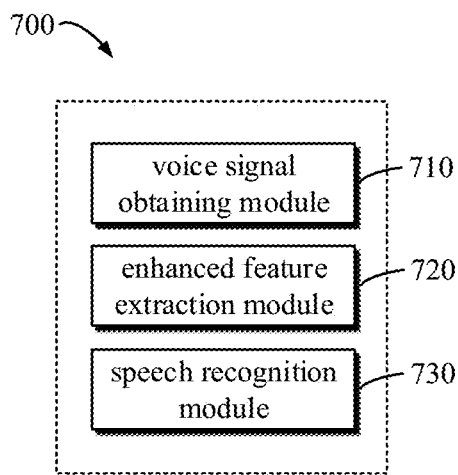
FIG. 7 is a block diagram of a speech recognition apparatus according to an embodiment of the disclosure.

FIG. 7 is a block diagram of a speech recognition apparatus 700 according to an embodiment of the disclosure. As illustrated in FIG. 7, the apparatus 700 includes a voice signal obtaining module 710, an enhanced feature extraction module 720 and a speech recognition module 730. The voice signal obtaining module 710 is configured to obtain a first voice signal collected from a first microphone in a microphone array and a second voice signal collected from a second microphone in the microphone array. The second microphone is different from the first microphone. The enhanced feature extraction module 720 is configured to extract enhanced features associated with the first voice signal and the second voice signal through a neural network. The speech recognition module 730 is configured to obtain a speech recognition result based on the enhanced features.

In some embodiments, the enhanced feature extraction module 720 includes a Fourier transform module, a convolution processing module and a conversion module. The Fourier transform module is configured to perform complex Fourier transform on the first voice signal and the second voice signal, respectively, to obtain a transformed first voice signal and a transformed second voice signal. The convolution processing module is configured to perform complex convolution, complex offset, and complex linear transformation on the transformed first voice signal and the transformed second voice signal transformed through a complex convolutional neural network to obtain complex features. The conversion module is configured to convert the complex features into enhanced features in real number.

In some embodiments, the speech recognition module 730 includes a character output module. The character output module is configured to determine, based on the enhanced features, a character output corresponding to the first voice signal and the second voice signal through a streaming multi-layer truncated attention model.

In some embodiments, the speech recognition module 730 further includes a feature compression module and a feature providing module. The feature compression module is configured to compress the enhanced features based on a predetermined size. The feature providing module is configured to provide the enhanced features compressed to the streaming multi-layer truncated attention model.

In some embodiments, the apparatus 700 further includes a direction determination module and a reminder light turn-on module. The direction determination module is configured to determine a direction of a target sound source associated with the first voice signal and the second voice signal based on the enhanced features. The reminder light turn-on module is configured to turn on a reminder light associated with the direction determined.

In some embodiments, the apparatus 700 further includes a wakeup determination module and a recognition initiation module. The wakeup determination module is configured to determine, based on the enhanced features, whether the first voice signal and the second voice signal involve a wakeup word. The recognition initiation module is configured to, in response to determining that the first voice signal and the second voice signal involve the wakeup word, initiate a character recognition process.

In some embodiments, the enhanced feature extraction module 720 includes a signal obtaining module and a feature extraction module. The signal obtaining module is configured to obtain a third voice signal collected from a third microphone in the microphone array. The feature extraction module is configured to extract enhanced features associated with the first voice signal, the second voice signal and the third voice signal through the neural network.

In some embodiments, the apparatus 700 further includes a multi-channel far-field voice signal obtaining module and a training module. The multi-channel far-field voice signal obtaining module is configured to obtain a same number of multi-channel far-field voice signals as microphones in the microphone array. The multi-channel far-field voice signals at least include a first far-field voice signal and a second far-field voice signal. The training module is configured to train an integrated end-to-end speech enhancement and recognition model by using the multi-channel far-field voice signals.

In some embodiments, the multi-channel far-field voice signal obtaining module includes a real-time simulation module. The real-time simulation module is configured to simulate, based on near-field voice signals, the multi-channel far-field voice signals in real time through a random noise addition.

In some embodiments, the real-time simulation module includes a random setting module. The random setting module is configured to randomly set simulation parameters: configurations of a room, a position of the microphone array in the room, a position of a target sound source in the room, and a position of a noise source in the room. The configurations of the room include a length, a width, and a height of the room, and a wall reflection coefficient.

In some embodiments, the real-time simulation module further includes an impulse response generation module. The impulse response generation module is configured to generate, based on the simulation parameters, a first group of impulse responses for the near-field voice signals and a second group of impulse responses for noise signals randomly selected.

In some embodiments, the real-time simulation module includes a second multi-channel far-field voice signal obtaining module. The second multi-channel far-field voice signal obtaining module is configured to generate the multi-channel far-field voice signals based on the near-field voice signals, the first group of impulse responses, the noise signals, the second group of impulse responses, and a signal-to-noise ratio.

It should be understood that the voice signal obtaining module 710, the enhanced feature extraction module 720 and the speech recognition module 730 illustrated in FIG. 7 may be included in one or more electronic devices. In addition, it should be understood that modules illustrated in FIG. 7 may perform steps and/or actions in the method and/or processes referred to embodiments of the disclosure.

Unlike conventional speech enhancement based on digital signal processing, embodiments of the disclosure extract the enhanced features of multi-channel voice signals through the neural network, which may solve the problem of inconsistency in optimization objectives of speech enhancement and speech recognition. Consequently, objectives of speech enhancement, speech recognition and the like may be optimized jointly, end-to-end modeling of speech enhancement and speech recognition is realized, and the accuracy of speech recognition is improved.

In addition, according to some embodiments of the disclosure, the complex CNN is used to directly perform the multi-scale and multi-layer information extraction on the original multi-channel voice signals. On the premise of retaining the phase information, the front-end beamforming and enhanced feature extraction are realized, and then the integrated modeling of speech enhancement and recognition is realized. Such an implementation does not require any priori assumption in digital signal processing and speech recognition, and the entire optimization process has one standard, that is, a word error rate of speech recognition. In addition, embodiments of the disclosure are fully data-driven. All far-field training may be established from near-field data through an easy and convenient simulation process. In the 100,000-hour product test carried out by the inventor, the performance of the test is far satisfying than that of conventional separate optimizations performed on digital signal processing and speech recognition, which significantly reduces the error rate of recognition.

Figure 8:
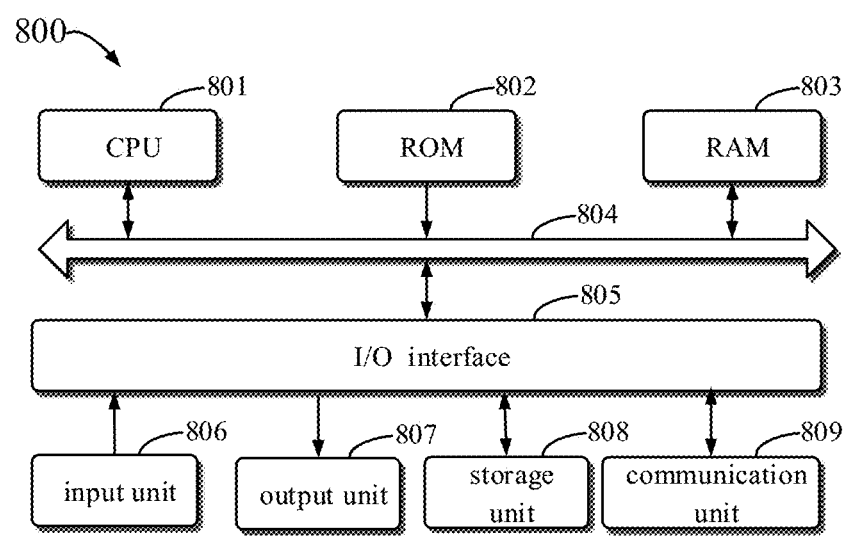
FIG. 8 is a block diagram of an electronic device capable of implementing embodiments of the disclosure.

FIG. 8 is a block diagram of an exemplary device 800 capable of implementing embodiments of the disclosure. It should be understood that the device 800 may be configured to implement the speech recognition apparatus 700, the user device or the server as described in the disclosure. As illustrated in the figure, the device 800 includes a central processing unit (CPU) 801, which may perform various suitable actions and processes in accordance with computer program instructions stored in a read only memory (ROM) 802 or loaded from a storage unit 808 into a random-access memory (RAM) 803. In the RAM 803, various programs and data necessary for operations of the device 800 may also be stored. The CPU 801, the ROM 802, and the RAM 803 are connected to each other through a bus 804. As illustrated in FIG. 8, an input/output (I/O) interface 805 is also connected to the bus 804.

A number of components in the device 800 are connected to the I/O interface 805, including: an input unit 806 such as a keyboard, a mouse, and the like; an output unit 807 such as various types of displays, speakers, etc.; a storage unit 808 such as a magnetic disk, an optical disk, or the like; and a communication unit 809 such as a network card, a modem, a wireless communication transceiver, and so on. The communication unit 809 allows the device 800 to exchange information/data with other devices via a computer network such as the Internet and/or various telecommunications networks.

The processing unit 801 performs the various methods and processes described above, such as the method 300. For example, in some embodiments, the method 300 may be implemented as a computer software program tangibly embodied on a machine-readable medium, such as the storage unit 808. In some embodiments, some or all of the computer programs may be loaded and/or installed onto the device 800 via the ROM 802 and/or the communication unit 809. When a computer program is loaded onto the RAM 803 and executed by the CPU 801, one or more steps in any one of the processes described above may be performed. Alternatively, in other embodiments, the CPU 801 may be configured to perform the method in any other suitable manner (e.g., by way of the firmware).

The functions described herein above may be performed, at least in part, by one or more hardware logic components. For example, and without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), and the like.

Program codes for performing the method in the disclosure may be written in any combination of one or more programming languages. These program codes may be provided to a processor or controller in a general-purpose computer, a special purpose computer, or other programmable data processing devices, such that the program codes, when executed by the processor or controller, are configured to implement functions/operations specified in the flow chart and/or block diagrams. The program code may be executed entirely on a machine, partly on the machine, as a separate software package, partly on the machine, partly on a remote computer, or entirely on the remote computer or server.

In the context of the disclosure, the machine-readable medium may be a tangible medium that may contain, or store a program for use by or in combination with an instruction execution system, an apparatus, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include: an electrical connection having one or more wires, a portable computer disk, a hard disk, a random access memory (RAM), a read only memory (ROM), an Erasable Programmable Read Only Memory (EPROM or a flash memory), an optical fiber, a compact disc read-only memory (CD-ROM), an optical memory component, a magnetic memory component, or any suitable combination thereof.

Moreover, while operations are described in a particular order, this should be understood as that the operations are required to be performed in a particular illustrated order or in a sequential order, or that all illustrated operations are required to be performed to achieve desirable results. In certain circumstances, multitasking and parallel processing may be advantageous. Likewise, while several specific implementation details are included in the above discussion, these should not be construed as limiting the scope of the disclosure. Certain features described in the context of separate embodiments may also be implemented in combination in a single implementation. Conversely, features that are described in the context of the single implementation may also be implemented in a plurality of implementations separately or in any suitable sub-combination.

Although embodiments of the disclosure have been described in a language specific to structural features and/or methodological acts, it is to be understood that the subject matter defined in the attached claims is not necessarily limited to the specific features or acts described above. Instead, the specific features and acts described above are merely exemplary forms for implementing the attached claims.

What is claimed is:

1. A speech recognition method, comprising:
   obtaining a first voice signal collected from a first microphone in a microphone array and a second voice signal collected from a second microphone in the microphone array, the second microphone being different from the first microphone;
   extracting enhanced features associated with the first voice signal and the second voice signal through a neural network;
   obtaining a speech recognition result based on the enhanced features;
   determining, based on the enhanced features, whether the first voice signal and the second voice signal involve a wakeup word; and
   in response to determining that the first voice signal and the second voice signal involve the wakeup word, initiating a character recognition process,
   wherein obtaining the speech recognition result comprises:
      compressing the enhanced features associated with the first voice signal and the second voice signal respectively into a dual-channel with a predetermined bandwidth size equivalent to a bandwidth of a single-channel of the enhanced features associated with one of the first or second voice signals; and
      providing the compressed enhanced features to a streaming multi-layer truncated attention model.

2. The method of claim 1, wherein extracting the enhanced features associated with the first voice signal and the second voice signal through the neural network comprises:
   performing complex Fourier transform on the first voice signal and the second voice signal, respectively, to obtain a transformed first voice signal and a transformed second voice signal;
   performing complex convolution, complex offset, and complex linear transformation on the transformed first voice signal and the transformed second voice signal through a complex convolutional neural network to obtain complex features; and
   converting the complex features into enhanced features in real number.

3. The method of claim 2, wherein obtaining the speech recognition result comprises:
   determining, based on the enhanced features, a character output corresponding to the first voice signal and the second voice signal through the streaming multi-layer truncated attention model.

4. The method of claim 2, further comprising:
   determining a direction of a target sound source associated with the first voice signal and the second voice signal based on the enhanced features; and
   turning on a reminder light associated with the direction determined.

5. The method of claim 1, wherein extracting the enhanced features associated with the first voice signal and the second voice signal through the neural network comprises:
   obtaining a third voice signal collected from a third microphone in the microphone array; and
   extracting enhanced features associated with the first voice signal, the second voice signal and the third voice signal through the neural network.

6. The method of claim 1, further comprising:
   obtaining a same number of multi-channel far-field voice signals as microphones in the microphone array, the multi-channel far-field voice signals at least comprising a first far-field voice signal and a second far-field voice signal; and
   training an integrated end-to-end speech enhancement and recognition model by using the multi-channel far-field voice signals.

7. The method of claim 6, wherein obtaining the same number of multi-channel far-field voice signals as the microphones in the microphone array comprise:
   simulating, based on near-field voice signals, the multi-channel far-field voice signals in real time through a random noise addition.

8. The method of claim 7, wherein simulating the multi-channel far-field voice signals in real time through the random noise addition comprises:
   randomly setting simulation parameters: configurations of a room, a position of the microphone array in the room, a position of a target sound source in the room, and a position of a noise source in the room, the configurations of the room comprising a length, a width, and a height of the room, and a wall reflection coefficient.

9. The method of claim 8, wherein simulating the multi-channel far-field voice signals in real time through the random noise addition comprises:
   generating, based on the simulation parameters, a first group of impulse responses for the near-field voice signals and a second group of impulse responses for noise signals randomly selected.

10. The method of claim 9, wherein simulating the multi-channel far-field voice signals in real time through the random noise addition comprises:

generating the multi-channel far-field voice signals based on the near-field voice signals, the first group of impulse responses, the noise signals, the second group of impulse responses, and a signal-to-noise ratio.

11. An electronic device, comprising:

one or more processors; and a storage device configured to store one or more programs, wherein when the one or more programs are executed by the one or more processors, the electronic device is caused to implement a speech recognition method, the method comprising:

obtaining a first voice signal collected from a first microphone in a microphone array and a second voice signal collected from a second microphone in the microphone array, the second microphone being different from the first microphone;

extracting enhanced features associated with the first voice signal and the second voice signal through a neural network;

obtaining a speech recognition result based on the enhanced features;

determining, based on the enhanced features, whether the first voice signal and the second voice signal involve a wakeup word; and in response to determining that the first voice signal and the second voice signal involve the wakeup word, initiating a character recognition process, wherein obtaining the speech recognition result comprises:

compressing the enhanced features associated with the first voice signal and the second voice signal respectively into a dual-channel with a predetermined bandwidth size equivalent to a bandwidth of a single-channel of the enhanced features associated with one of the first or second voice signals; and providing the compressed enhanced features to a streaming multi-layer truncated attention model.

12. The electronic device of claim 11, wherein extracting the enhanced features associated with the first voice signal and the second voice signal through the neural network comprises:

performing complex Fourier transform on the first voice signal and the second voice signal, respectively, to obtain a transformed first voice signal and a transformed second voice signal;

performing complex convolution, complex offset, and complex linear transformation on the transformed first voice signal and the transformed second voice signal through a complex convolutional neural network to obtain complex features; and converting the complex features into enhanced features in real number.

13. The electronic device of claim 12, wherein obtaining the speech recognition result comprises:

determining, based on the enhanced features, a character output corresponding to the first voice signal and the second voice signal through the streaming multi-layer truncated attention model.

14. The electronic device of claim 12, wherein the method further comprises:

determining a direction of a target sound source associated with the first voice signal and the second voice signal based on the enhanced features; and turning on a reminder light associated with the direction determined.

15. The electronic device of claim 11, wherein extracting the enhanced features associated with the first voice signal and the second voice signal through the neural network comprises:

obtaining a third voice signal collected from a third microphone in the microphone array; and extracting enhanced features associated with the first voice signal, the second voice signal and the third voice signal through the neural network.

16. A computer-readable storage medium having a computer program stored thereon, wherein when the program is executed by a processor, a speech recognition method is implemented, the method comprising:

obtaining a first voice signal collected from a first microphone in a microphone array and a second voice signal collected from a second microphone in the microphone array, the second microphone being different from the first microphone;

extracting enhanced features associated with the first voice signal and the second voice signal through a neural network;

obtaining a speech recognition result based on the enhanced features;

determining, based on the enhanced features, whether the first voice signal and the second voice signal involve a wakeup word; and in response to determining that the first voice signal and the second voice signal involve the wakeup word, initiating a character recognition process, wherein obtaining the speech recognition result comprises:

compressing the enhanced features associated with the first voice signal and the second voice signal respectively into a dual-channel with a predetermined bandwidth size equivalent to a bandwidth of a single-channel of the enhanced features associated with one of the first or second voice signals; and providing the compressed enhanced features to a streaming multi-layer truncated attention model.

* * * * *